United States Patent Office 3,336,136
Patented Aug. 15, 1967

3,336,136
NUTRIENT COMPOSITIONS FOR FEEDING RUMINANTS TO INCREASE FEED EFFICIENCY
Herbert T. Peeler, Mount Prospect, Ill., assignor to International Minerals & Chemical Corporation, a corporation of New York
No Drawing. Filed Dec. 18, 1963, Ser. No. 331,365
16 Claims. (Cl. 99—2)

This application is a continuation-in-part of my earlier filed pending application Ser. No. 238,749, filed Nov. 19, 1962, now abandoned.

The present invention generally relates to ruminant feed compositions containing an effective growth-stimulating and feed conversion factor. In a particular aspect the invention relates to supplemented animal feedstuffs containing chemical compositions substantially biologically equivalent to lysine.

The science of animal nutrition has shown that there are 10 essential amino acids necessary for animal growth. These essential amino acids must be provided in the animal diet or they must be synthesized within the animal. Research investigations have demonstrated that all of the 10 essential amino acids can be synthesized from urea by means of the rumen's microbial action. However, some of the essential amino acids are not synthesized rapidly enough for maximum performance when relative large amount of urea are provided in the diet.

A majority of the mixed protein supplements used in cattle rations contain from 30 to 32% protein. Recently there has been considerable interest in feeding supplements with higher levels of protein (48 to 100%), wherein the extra protein equivalent is made up with non-protein nitrogen source, such as ammonia salts or urea. Theoretically, this should reduce the total amount of protein supplement required to balance the ration. However, the limiting factor in the past has been that cattle could not effectively meet more than ⅓ of their protein requirement from non-protein sources, and the remainder had to be furnished from natural sources.

It has previously been reported that the amino acid lysine will stimulate weight gain and feed efficiency in beef cattle. This effect appeared to be greatest when the cattle received a ration containing a substantial amount of urea. In fact, research investigations have indicated that lysine is one of the limiting nutritional factors in the utilization of urea by cattle. It is for this reason that lysine has, to a limited extent, been used to supplement ruminant diets. The effects of lysine in animal diets containing relatively large amounts of non-protein nitrogen have, however, not been consistent and a considerable amount of study has been directed to this problem by the animal feed industry.

It has now been discovered, and the present invention is in part based on this discovery, that certain compounds when provided in ruminant feed compositions containing non-protein nitrogen sources promote and accelerate the rate of growth of ruminant animals and increase the efficiency of utilization of the feed consumed. The compounds of this invention, in fact, exhibit a biological effect which is substantially equivalent to lysine. The herein described feeds are particularly effective in the feeding of ruminants such as cattle, sheep and the like.

Accordingly, it is an object of the present invention to provide a novel ruminant nutrient composition.

It is a further object of the invention to provide supplemented animal feedstuffs containing chemical compositions substantially biologically equivalent to lysine.

It is another object to provide supplemented animal feedstuffs containing a relatively large amount of the protein equivalent as non-protein nitrogen compounds and containing a chemical composition biologically equivalent to lysine.

These and other objects and advantages of the present invention will be apparent from the description of the invention.

In general the present invention is a ruminant feed composition comprising an edible carrier and a chemical composition generally biologically equivalent to lysine.

Animal feeds regularly contain animal and/or vegetable proteins, or hydrolysates of proteinaceous materials which can be orally consumed. As hereinbefore set forth, considerable interest has been shown in providing non-protein nitrogen sources in animal diets, the nitrogen compounds being converted into proteins in the rumen of the animal. It is desirable to make up the extra protein equivalent in animal diets with non-toxic ammonium salts or urea because of advantages in storing and handling the urea and often because of the relatively lower cost of urea, ammonium phosphates, and the like, as compared with the natural proteins. Unfortunately, as hereinbefore set forth, the rumen has not been able to effectively utilize all of the extra protein equivalent provided. However, when the chemical compositions of the present invention are added to ruminant diets, the ruminant is able to more effectively utilize the non-protein nitrogen. The discovery that these certain chemical compositions have desirable activity in such diets is significant not only in that it provides another source of lysine activity but the chemical compositions of the present invention also have a considerable price advantage, many of them being available on the market at a cost considerably less, for example ½, that of agricultural grade lysine. The chemical compositions of the present invention are compounds of the group consisting of 7-oxo-6, 8-dioxabicyclo (3,2,1) octane; 3,4-dihydro-2H-pyran-2-carboxylic acid and the $C_7$–$C_{12}$ esters, $C_6$–$C_{12}$ amides, and non-toxic salts thereof; and compounds of the formula:

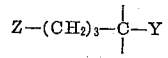

wherein Z is of the group consisting of primary and $C_1$ to $C_6$ amide radicals, primary amino radicals, aldehyde radicals, $C_3$ to $C_7$ 1,1-dialkoxy methyl radicals, carboxyl radicals, and $C_1$ to $C_6$ esters and non-toxic salts of carboxyl radicals; Y is of the group consisting of primary and $C_1$ to $C_6$ amide radicals, aldehyde radicals, $C_3$ to $C_7$ 1,1-dialkoxy methyl radicals, carboxyl radicals and $C_1$ to $C_6$ esters and non-toxic salts of carboxyl radicals; and the two unspecified carbon valances are satisfied by one of the group consisting of (1) a hydrogen and a primary amino radical, (2) a hydrogen and a hydroxyl radical, and (3) an oxo oxygen radical; and mixtures thereof. The ammonium, sodium potassium, magnesium, calcium and zinc salts of the carboxylic acids are preferred. A specifically preferred salt is sodium 3,4-dihydro-2H-pyran- 2-carboxylate monohydrate. Compounds typifying the principal sub-genera of the aforedefined group, together with their formuli, are:

| Formula | Name |
|---|---|
| (pyran ring structure with HC, CH₂, CH₂, HC, HC—COOH, O) | 3,4-dihydro-2H-pyran-2-carboxylic acid. |
| (bicyclic structure with H₂C, CH₂, HC, CH, O, O, C=O) | 7-oxo-6,8-dioxabicyclo (3,2,1) octane. |
| $H_2N(CH_2)_4CHCOOH$ with OH | 6-amino-2-hydroxyhexanoic acid. |
| $\begin{array}{c}COOH\\ C=O\\ (CH_2)_3\\ COOH\end{array}$ | Alpha-ketoadipic acid. |
| $\begin{array}{c}COOH\\ H-C-NH_2\\ (CH_2)_3\\ H-C-OC_2H_5\\ OC_2H_5\end{array}$ | 2-amino-6,6-diethoxyhexanoic acid. |
| $\begin{array}{c}COOH\\ HC-NH_2\\ (CH_2)_3\\ COOH\end{array}$ | Alpha-amino adipic acid. |
| $\begin{array}{c}COOH\\ HC-NH_2\\ (CH_2)_3\\ CHO\end{array}$ | The 6-semialdehyde of alpha-amino adipic acid. |
| $\begin{array}{c}COOH\\ C-NH_2\\ (CH_2)_3\\ O=C-OC_2H_5\end{array}$ | 6-ethyl alpha-amino adipate. |

Other suitable materials include the following compounds which are listed to illustrate, not to limit, the afore-defined class of materials:

calcium 3,4-dihydro-2H-pyran carboxylate
ethyl 3,4-dihydro-2H-pyran carboxylate
hexyl 3,4-dihydro-2H-pyran carboxylate
3,4-dihydro-2H-pyran carboxyl amide
3,4-dihydro-2H-pyran carboxyl diethylamide
sodium 6-amino 2-hydroxyhexanoate
zinc 6-amino 2-hydroxyhexanoate
ethyl 6-amino 2-hydroxyhexanoate
hexyl 6-amino 2-hydroxyhexanoate
6-amino 1,1-diethoxyhexanol-2
6-amino 1,1-dimethylhexanol-2
6-amino-2-hydroxyhexanoamide
6-amino-2-dihydroxy N,N-diethylhexanoamide
6-amino-2-hydroxy caproaldehyde
1-monosodium alpha-keto adipate
disodium alpha-keto adipate
1-methyl alpha-keto adipate
alpha-keto-adipic acid 1-monoamide
alpha-keto-adipic acid 1-mono N,N-diethylamide
alpha-keto-adipic acid 1-semialdehyde
6,6-diethoxy-alpha-keto hexanoic acid
potassium 6,6-dimethoxy-alpha-keto hexanoate
calcium 6,6-dimethoxy-alpha-keto hexanoate
ethyl 6,6-dimethoxy-alpha-keto hexanoate
pentyl 6,6-dimethoxy-alpha-keto hexanoate
6,6-diethoxy-alpha-keto hexanoamide
6,6-diethoxy-alpha-keto hexanoic acid N,N-diethylamide
6-diethylacetal of 2-keto-adipaldehyde
tetraethylacetal of 2-keto-adipaldehyde
1-monopotassium alpha-amino-adipate
disodium alpha-amino-adipate
6-monomethyl alpha-amino-adipate
diethyl alpha-amino-adipate
alpha-amino-adipic acid 1-monoamide
alpha-amino-adipic acid diamide
alpha-amino-adipic-acid di(N,N-dimethyl)amide
alpha-amino adipaldehyde
1,1-diethylacetal of 2-amino-adipaldehyde
sodium 6-semialdehyde alpha-amino-adipate
ethyl 6-semialdehyde alpha-amino-adipate
6-semialdehyde alpha-amino-adipamide
6-ethyl 1-semialdehyde of alpha-amino adipate
1,1-diethyl acetal of 6-ethyl alpha-amino-adipate
1-semialdehyde of alpha-amino-adipic acid
1-sodium 6-ethyl alpha-amino-adipate These chemical compositions useful in accordance with this invention are normally provided in the animal diet in relatively small, growth-promoting amounts, however, for best results it should be present in an amount of at least 5 mg. per 1 lb. of animal feed supplement or at least about 0.001% by weight of the animal feed supplement, although much larger amounts may be used. In general the chemical compositions are fed to the animal in an amount of from about 0.002% to about 2.0% by weight of the animal feed supplement. As hereinbefore set forth the lysine activity of the chemical compositions of this invention is particularly effective when the animal diet contains urea or an ammonium salt as a protein source and is particularly effective when at least 5%, more preferably 10%, of the protein of the animal feed is provided as urea.

The chemical composition of this invention can be administered orally in the form of a drench or bolus; however, such administration has the disadvantage of requiring a periodic segregation and handling of each individual animal. The preferred method for administration is in association with the feed.

The chemical composition of this invention may be administered in one component of the feed or it may be blended uniformly throughout a mixed feed.

A variety of feed components may be used in the animal diets and the invention is not limited to any particular feed, such as the basal cattle ration described in the example because the compounds of this invention can be combined with any conventional or desired edible ration such as solid feed or mash customarily used for the particular ruminant involved. The tests described in the example also demonstrate that the presence of the compounds of this invention in the feed was in no way objectionable to the animals as to taste, odor or digestibility.

In order to give a fuller understanding of the invention the following specific examples are given:

EXAMPLE I

Two calves in a carefully controlled environment are fed a supplemented ratio containing a high level of urea. The supplement added to the ratio contains 64% protein wherein half of the protein equivalent is made up by urea. One pound of the supplement is added to the daily ration for each animal. Substantially duplicate rations are fed to the calves except ten milligrams of sodium 3,4-dihydro-2H-pyran-2-carboxylate monohydrate per pound of supplement is added to the one pound of supplement mixed with the daily feed ration for one of the calves.

The feed intake and metabolism of the calves are carefully determined and a nitrogen balance is calculated.

The calf fed the sodium carboxylate salt exhibits a greater weight gain, increased nitrogen retention and a higher feed efficiency.

EXAMPLE III

Two experiments were conducted at the Agricultural Experiment Station of the Purdue University School of Agriculture which involved the used of the two sets of identical twin calves. All of the following information and data were supplied by the Purdue University Agricultural Experiment Station. One set of the twin valves was identical crossbred (Hereford × Guernsey) steers and the other set was identical crossbred (Angus × Jersey) heifers. The twins were determined identical by blood type and color markings. They were separately housed throughout the preliminary and collection periods and, with few exceptions, the environmental temperature was maintained between 60 to 70° F. for the course of time that the digestion trials were conducted. During the preliminary periods, the calves were located in pens providing 75 square feet of concrete floor space for each set of twins. In order to provide separate treatments and equalized feed intake, the twins were tied by halter and provided with individual feed bunks.

Since the calves had been used previously in digestion studies they were placed in the metabolism stalls only two days prior to collection. Each time the calves were reversed on treatment, they were switched to the opposite stall to prevent any position effect. The calves were exercised about every third day during the collection period.

A seven-day collection period was used in all five trials, as several workers have shown a high correlation between the data obtained from a seven-day and ten-day collection period. Nitrogen balance and digestibility of gross energy were used as the criteria of measurement.

The data obtained from the two experiments were analyzed statistically by a randomized block test. The values used in the statistical test were percentages of nitrogen intake retained and percentage of gross energy digested.

*Laboratory methods*

The total excreta collected from each calf was accurately weighed and sampled for analysis every 24 hours at approximately 8:00 a.m. The urine was collected in a 12-liter Pyrex carboy with 25–30 milliliters of toluene added to prevent nitrogen loss. The feces excreted during the day were placed in a closed bucket overnight to prevent moisture loss. The fecal material was sampled by shoveling the feces to one end of the tub, pulverizing it well, leveling it to a layer about three inches deep and removing a thin layer with a wooden paddle across the entire width of the tub. Approximately one pint of feces and urine each was taken for laboratory analyses.

The feeds were sampled daily by probing, if possible, or by hand and made into a composite sample for analysis.

*Nitrogen determination.*—Nitrogen determinations were made daily on the wet fecal and urine samples from each calf; nitrogen was determined on the composite feed samples "as fed" at the end of each collection period. The Kjeldahl method (A.O.A.C., 1955) was used for the nitrogen determinations with slight modifications: approximately 150 milligrams of red mercuric oxide and 15 grams of sodium sulfate were used rather than the prescribed amount of each respective compound. Wet fecal samples of approximately six to eight grams were used and 10 to 15 milligrams of paraffin added before digestion to prevent frothing. Five milliliters of urine was pipetted into the digestion flask for digestion and the specific gravity determined later with a urinometer to be used in calculating the weight of the sample. Approximately two grams of the composite feed sample were used in the determinations. All determinations were made in duplicate.

*Gross energy determination.*—Energy determinations were performed on the feces collected from each calf daily throughout all five collection periods. Approximately 200 grams of wet feces were procured and dried for subsequent analysis. A temperature of 80° C. for 72 hours was used in trials 1 and 2. The temperature was reduced to 65° C. for 96 hours in trials 3, 4 and 5, since it was possible that some energy was being lost at the higher temperature.

Since the feces were dried before gross energy determination, the composite feed samples were dried at the same temperatures and the percent of gross energy digested expressed on a dry matter basis.

The dried fecal or feed samples were ground in a Wiley mill with a coarse screen. One-gram samples were burned in a Parr Adiabatic Bomb Calorimeter. Gross energy determinations were performed in duplicate.

*Experiments 1 and 2*

Two trials were conducted to determine the nitrogen balance and digestible energy of adding 10 grams of sodium 3-4-dihydro-2H-pyran-2-carboxylate monohydrate (hereinafter referred to as $C_6$ sodium salt) per head daily to a 64 percent protein supplement for fattening beef cattle. One set of identical crossbred heifer calves and one set of identical crossbred steers were used in each trial. One twin in each set was fed 10 grams of the $C_6$ sodium salt daily and the other twin was the control. The animals were reversed on treatment within sets of twins at the end of Experiment 1 as shown below:

| Ear Tag No. | Heifers | | Steers | |
|---|---|---|---|---|
| | 1901 | 1902 | 1903 | 1904 |
| Expt. 1 | Control | $C_6$ Sodium Salt | Control | $C_6$ Sodium Salt. |
| Expt. 2 | $C_6$ Sodium Salt | Control | $C_6$ Sodium Salt | Control. |

Feed intake was equalized within sets of twins by making use of the paired-feeding technique. Water, iodized salt and a mineral mixture of two parts bone meal and one part iodized salt were supplied ad libitum.

The following complete high-energy ration was used as a pattern in the digestion trials:

| Ingredient: | Percent |
|---|---|
| Rolled shelled corn | 73 |
| Ground corn cobs | 20 |
| 64% supplement | 7 |
| | 100 |

The high-urea 64% supplement had the following composition:

| Ingredient: | Lbs. |
|---|---|
| Soybean meal (44%) | 503.2 |
| Alfalfa meal | 140.0 |
| Molasses, cane | 140.0 |
| Urea (262% protein equivalent) | 145.8 |
| Dicalcium phosphate | 52.0 |
| Salt (NaCl) | 17.0 |
| Vitamin A and D concentrate [1] | 2.0 |
| | 1000.0 |

[1] Stabilized dry vitamin A and D concentrate containing 4,540,000 USP units vitamin A and 567,500 USP units of vitamin D per pound.

The above ration would analyze about 10.5 percent protein, the recommended level for fattening beef cattle. In Experiments 1 and 2, the above ration was mixed minus some of the corn to allow for adjustment in appetite by varying the additional corn added. This provided a constant intake of protein supplement, ground corn cobs and $C_6$ sodium salt. The additional corn and the ration were accurately weighed, handmixed, and fed twice daily. An ample supply of each of the ration ingredients was set aside to insure having ingredients of the same origin throughout both trials, thereby reducing one source of experimental error.

The calves were fed the pattern complete high-energy ration listed above for three weeks prior to adding the $C_6$ sodium salt to allow for adjustment from a different type ration previously fed. The preliminary period was 20 days for both Experiments 1 and 2; a seven-day collection period was used in both trials.

*Results—Experiments 1 and 2*

The amount of nitrogen retained in both experiments was in favor of the $C_6$ sodium salt in the case of the heifers (Tables 1 and 2). This was true also for the steers in Experiment 2 but not in Experiment 1. When the average nitrogen retained (gm./day) was combined for the two trails within sets of twins, the results were in favor of the $C_6$ sodium salt in both the heifers and steers (Table 5). When the data were combined for heifers and steers (4 animals each), the results were also in favor of the $C_6$ sodium salt as evidence by 8.08 versus 3.68 grams of nitrogen retained daily (Table 5).

The percentage of gross energy digested in both trials was in favor of the $C_6$ sodium salt with the heifers (Tables 3 and 4). When the percentage of gross energy digested was combined for the two trials within sets of twins, the results were in favor of the $C_6$ sodium salt with the heifers and in favor of the control with the steers (Table 5). However, when the data were combined for heifers and steers (4 animals each), it ws in favor of the $C_6$ sodium salt as evidenced by 68.94 versus 68.33 percent digested (Table 5).

*Example*

Two calves in a carefully controlled environment are fed a supplemented ration containing a high level of urea. The supplement added to the ration contains 64% protein wherein half of the protein equivalent is made up by urea. One pound of the supplement is added to the daily ration for each animal. Substantially duplicate rations are fed to the calves except ten milligrams of sodium 3-4 dihydro-2H-pyran-2-carboxylate monohydrate per pound of supplement is added to the one pound of supplement mixed with the daily feed ration for one of the calves.

The feed intake and metabolism of the calves are carefully determined and a nitrogen balance is calculated.

The calf fed the sodium carboxylate salt exhibits a greater weight gain and a higher feed efficiency.

*Discussion*

The amount of nitrogen retained was in favor of the $C_6$ sodium salt treatment (10 grams daily) in three of the four times tested to give an over-all picture in favor of the $C_6$ sodium salt.

The description of the invention utilized specific reference to certain details; however, it is to be understood that such details are illustrative only and are not given with the intention of limiting the invention thereto. Other modifications and equivalents of the invention will be apparent to those skilled in the art from the foregoing description.

Having now fully described and illustrated the invention, what is desired to be secured and claimed by Letters Patent is set forth in the appended claims.

The embodiments of the invention in which an exclusive property or privilege is claimed are defined as follows:

1. A ruminant feed composition comprising an edible ration and at least about 0.001% by weight of a material of the group consisting of 7-oxo-6, 8-dioxabicyclo (3,2,1) octane; 3,4-dihydro-2H-pyran-2-carboxylic acid and the $C_7$–$C_{12}$ esters, $C_6$–$C_{12}$ amides, and non-toxic salts thereof; and compounds of the formula:

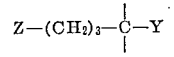

wherein Z is of the group consisting of primary and $C_1$ to $C_6$ amide radicals, primary amino radicals, aldehyde radicals, $C_3$ to $C_7$ 1,1-dialkoxy methyl radicals, carboxylic radicals, and $C_1$ to $C_6$ esters and non-toxic salts of carboxyl radicals, Y is of the group consisting of primary and $C_1$ to $C_6$ amide radicals, aldehyde radicals, $C_3$ to $C_7$ 1,1-dialkoxy methyl radicals, carboxyl radicals and $C_1$ to $C_6$ esters and non-toxic salts of carboxyl radicals, and the two unspecified carbon valences are satisfied by one of the group consisting of (1) a hydrogen and a primary amino radical, (2) a hydrogen and a hydroxyl radical, and (3) an oxo oxygen radical; and mixtures thereof.

2. The ruminant feed composition of claim 1 wherein said material comprises sodium 3,4-dihydro-2H-pyran-2-carboxylate.

3. The ruminant feed composition of claim 1 wherein said material comprises 7-oxo-6, 8-dioxabicyclo (3,2,1) octane.

4. The ruminant feed composition of claim 1 wherein said material comprises 6-amino-2-hydroxyhexanoic acid.

5. The ruminant feed composition of claim 1 wherein said material comprises alpha-ketoadipic acid.

6. The ruminant feed composition of claim 1 wherein said material comprises alpha-amino adipic acid.

7. The ruminant feed composition of claim 1 wherein said material comprises the semialdehyde of alpha-aminoadipic acid.

8. The ruminant feed composition of claim 1 wherein said $C_6$ material is present in an amount of about 0.002% to 2.0% by weight of said edible ration.

9. The ruminant feed composition of claim 1 which also contains a non-toxic, non-protein nitrogen source.

10. The composition in accordance with claim 9 in which said nitrogen source comprises a non-toxic ammonium salt.

11. The composition in accordance with claim 9 in which said nitrogen source comprises urea.

12. A process for obtaining increased weight gain in ruminant animals comprising the feeding to a ruminant animal of an edible ration and at least about 0.001% by weight of a material of the group consisting of 7-oxo-6, 8-dioxabicyclo (3,2,1) octane; 3,4-dihydro-2H-pyran-2-carboxylic acid and the $C_7$–$C_{12}$ esters, $C_6$–$C_{12}$ amides, and non-toxic salts thereof; and compounds of the formula:

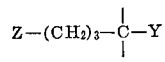

wherein Z is of the group consisting of primary and $C_1$ to $C_6$ amide radicals, primary amino radicals, aldehyde radicals, $C_3$ to $C_7$ 1,1-dialkoxy methyl radicals, carboxylic radicals, and $C_1$–$C_6$ esters and non-toxic salts of carboxyl radicals, Y is of the group consisting of primary and $C_1$ to $C_6$ amide radicals, aldehyde radicals, $C_3$ to $C_7$ 1,1-dialkoxy methyl radicals, carboxyl radicals and $C_1$ to $C_6$ esters and non-toxic salts of carboxyl radicals, and the two unspecified carbon valences are satisfied by one combination of the group consisting of (1) a hydrogen and a primary amino radical, (2) a hydrogen and a hydroxyl radical, and (3) an oxo oxygen radical; and mixtures thereof in combination with a non-toxic, non-protein nitrogen source.

13. The process of claim 12 wherein said $C_6$ material comprises sodium 3,4-dihydro-2H-pyran-2-carboxylate.

14. The process of claim 12 wherein said $C_6$ material comprises 7-oxo-6, 8-dioxabicyclo (3,2,1) octane.

15. The method in accordance with claim 12 in which said nitrogen source is a non-toxic ammonium salt.

16. A process in accordance with claim 12 in which said nitrogen source comprises urea.

No references cited.

A. LOUIS MONACELL, *Primary Examiner.*

H. H. KLARE, *Assistant Examiner.*